Oct. 12, 1926.
E. J. BECK
1,602,741
GAUGE STICK
Filed July 15, 1925
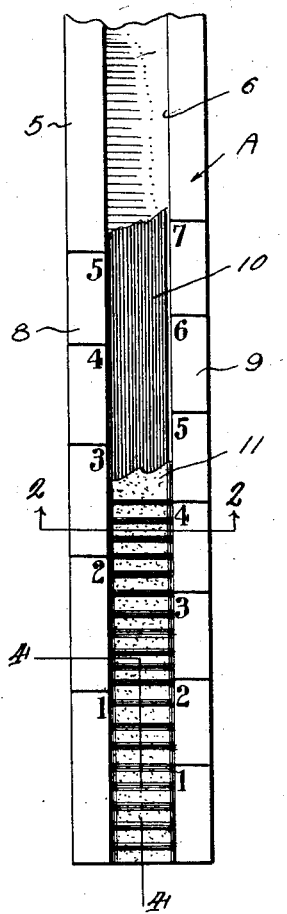
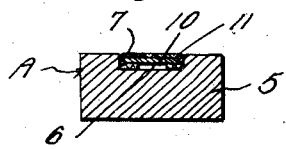
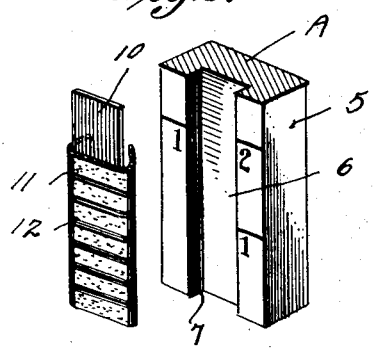
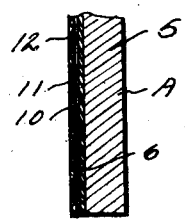
WITNESSES
Inventor
EDWARD J. BECK
By Richard B. Owen
Attorney Patented Oct. 12, 1926.

1,602,741

UNITED STATES PATENT OFFICE.

EDWARD J. BECK, OF DETROIT, MICHIGAN.

GAUGE STICK.

Application filed July 15, 1925. Serial No. 43,862.

This invention appertains to measuring implements and more particularly to a novel type for measuring liquid in a tank such as gasoline in an automobile supply tank.

The primary object of the present invention is to provide a gauge stick for measuring the quantity of gasoline in a supply tank, the gauge stick being so constructed as to permit the height of the liquid marked thereon to be readily seen after the gauge stick has been withdrawn from the tank.

One of the common means of measuring the quantity or height of gasoline in a tank is to insert a graduated gauge stick within the tank and note the height of the mark on the gauge or stick as the same is withdrawn from the tank. In actual practice, it is difficult to read the height of the wet mark on the gauge especially if the gauge has become soiled through use. It is therefore a prime object to provide such a gauge stick in which the height of the liquid mark on the stick can be plainly and instantly seen.

A further object of the invention is to provide a gauge stick for gasoline tanks having a brightly colored insert running longitudinally on the same covered by normally opaque material, such as thin cloth, the opaque material becoming semi-transparent when wet, thereby permitting the brightly colored insert to be readily seen.

A further object of the invention is to provide novel means for preventing the creeping of the liquid up the fabric and insert by capillary attraction said means embodying transversely extending ridges of material impervious to water carried by the fabric and engaging the outer face of the insert.

A further object of the invention is to provide novel means for retaining the insert and fabric in place on the gauge stick body by friction.

A still further object of the invention is to provide a gauge for gasoline tanks of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed, and illustrated in the accompanying drawings, in which drawings:

Figure 1 is a fragmentary side elevation of the novel gauge stick showing parts thereof broken away, Figure 2 is a transverse section through the same taken on the line 2—2 of Figure 1 looking in the direction of the arrows, Figure 3 is a fragmentary perspective view illustrating the means of folding the fabric strip about the insert and showing the insert ready to be placed on the gauge stick body, and Figure 4 is a fragmentary longitudinal section through the device taken on the line 4—4 of Figure 1 showing the novel dams or means for preventing the creeping of the liquid up the fabric and insert.

Referring to the drawings in detail, wherein similar reference characters designate corresponding parts throughout the several views, the letter A generally indicates the improved gauge stick for measuring the height of a liquid in a tank, which comprises the flat body 5, which can be constructed of any preferred material, such as wood or the like. One face of the body is provided with a longitudinally extending groove 6 which extends the full length of the body and as clearly shown the groove is spaced equal distances from the side edges of the body. While I have shown the groove 6 with straight parallel side walls 7, it is to be understood that the groove can be of a dovetail construction with oppositely inclined side walls if preferred.

The mentioned face of the body 5 on opposite sides of the groove 6 is provided with graduations 8 and 9 of different types to permit the gauge to be used with different sizes or shapes of gasoline tanks, as is readily understood in the art.

In accordance with this invention I provide a longitudinally extending insert 10 for the groove 6 and this insert is of a bright color, such as red in order to permit the insert to be readily seen, as will be hereinafter more fully described. The insert 10 can be made of any preferred material, such as suitably painted tin, celluloid, linoleum or the like.

The insert 10 is normally hid from view by a fabric strip 11 and this strip is placed over the outer face of the insert 10 with the side edges folded about the rear face of the insert. After the fabric strip 11 has been folded about the insert 10, as described, the insert is forced within the groove 6. The fabric strip 11 is preferably formed of a relatively thin material and is drawn tightly about the insert so that when the fabric becomes wet, the bright colored insert will be readily seen therethrough. While I have stated that the strip which covers the insert 10 is formed of fabric, I do not desire to limit myself to the fabric as other material can be used providing the same have the quality of being semi-transparent when they are immersed in liquid or become thoroughly wet.

The gauge is used in the same manner as the ordinary type of gauges, that is the same is inserted into the tank until the lower edge thereof reaches the bottom of the tank after which the same is withdrawn. The liquid will impregnate the fabric causing the same to closely adhere to the insert and the insert can be readily seen, therethrough, which will permit the height of the liquid to be readily read. The fabric 7 dries quickly and the gauge can be used over and over again.

In order to prevent the creeping of the liquid up the fabric and insert 10 by capillary attraction, the fabric 11 can be impregnated at spaced points with a liquid proof substance 12, such as paint or the like. The fabric is treated so that the paint extends transversely of the strip as can be readily seen by referring to Figures 1, 3 and 4 of the drawings. It is also preferred to have the waterproof material relatively thick on the inner face of the fabric for engaging the insert 10 in order to prevent the creeping of the gasoline up the insert, as well as up the fabric.

The arrangement of the fabric, the insert and the means for preventing the creeping of the gasoline up the fabric and insert forms the vital parts of my invention.

Changes in details may be made without departing from the spirit or scope of this invention, but—

What I claim as new is:

1. A liquid gauge stick for measuring the height of a liquid within a tank comprising a body having graduations thereon and means for facilitating the reading of the graduations including a colored portion adjacent to said graduations and a fabric strip over said colored portion adapted to become semi-transparent when wet.

2. A gauge stick for measuring the height of the liquid within a tank comprising a body, a colored strip extending longitudinally of the body and a normally opaque material covering the colored strip adapted to become semi-transparent when wet, and means for preventing the creeping of the liquid up said strip by capillary attraction.

3. A gauge stick for measuring the height of a liquid within a tank embodying a body, a colored strip extending longitudinally of the body and a normally opaque material covering the colored strip adapted to become semi-transparent when wet.

4. A gauge stick for measuring the height of a liquid within a tank comprising an elongated body having a longitudinally extending groove formed in one face thereof, a bright colored insert arranged to fit within the groove, and a relatively thin strip of fabric placed over the strip and held in place in the groove by said strip.

5. A gauge stick for measuring the height of a liquid within a tank comprising an elongated body having a longitudinally extending groove formed in one face thereof spaced equally from the opposite side edges of the body, the mentioned face of the body being provided with graduations on opposite sides of the groove, a brightly colored insert arranged within the groove, and a strip of fabric placed over the insert and held in the groove by said insert, as and for the purpose specified.

6. A gauge stick for measuring the height of a liquid within a tank embodying a body, a colored strip extending longitudinally of the body, a normally opaque fabric covering the colored strip adapted to become semi-transparent when wet, and liquid impervious material extending across the fabric at spaced points to prevent the creeping of the liquid up the fabric by capillary attraction.

In testimony whereof I affix my signature.

EDWARD J. BECK.